P. MICHAEL.
WEEDING TOOL.

116736        PATENTED JUL 4 1871

Witnesses.
C. M. Lanous.
E. H. Bates.

Inventor.
Philip Michael
Chipman & Foemer
Attys

UNITED STATES PATENT OFFICE.

PHILIP MICHAEL, OF FROSTBURG, MARYLAND.

IMPROVEMENT IN WEEDING-TOOLS.

Specification forming part of Letters Patent No. 116,736, dated July 4, 1871.

*To all whom it may concern:*

Be it known that I, PHILIP MICHAEL, of Frostburg, in the county of Alleghany and State of Maryland, have invented a new and valuable Improvement in Weeding-Tools; and I do hereby declare that the following is a full, clear, and exact description of the construction and operation of the same, reference being had to the annexed drawing making a part of this specification, and to the letters and figures of reference marked thereon.

Figure 1:
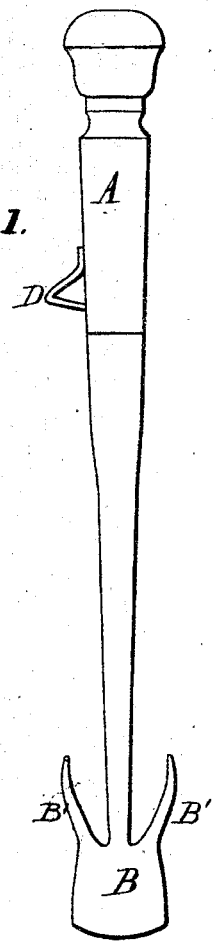
Figure 3:
Figure 2:
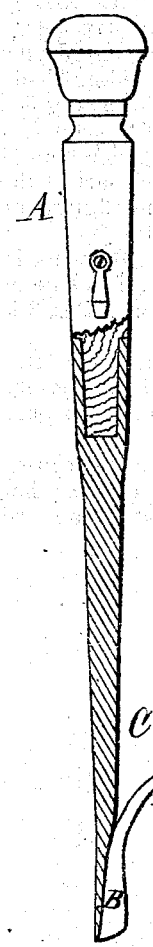

Figure 1 of the drawing is a face view of my invention. Fig. 2 is a side elevation and partial vertical section, and Fig. 3 is a lower end view of the same.

This invention has relation to an improved weeding-tool, and the novelty consists in the peculiar construction of its parts as hereinafter described.

In the accompaning drawing illustrating this invention, A represents a handle, which may be the same as that of an ordinary spade; B, a curved or shovel-shaped blade, provided with two long tines, B', curving forward from the upper part of it; C, the blade-shank, into which the lower end of the handle fits and is fastened; D, a loop or foot-piece, intended as a means for pressing the blade into the earth. The blade is inserted in the ground beside the plant or weed, or under its roots, and when drawn out the tines B' take hold of the roots, stems, and leaves, and this enables the weed to be fully removed.

I claim as my invention—

The herein-described weeding-tool, consisting of the curved blade B with tines B' and handle A, all constructed and used as and for the purpose specified.

In testimony that I claim the above I have hereunto subscribed my name in the presence of two witnesses.

PHILIP MICHAEL.

Witnesses:
JOHN L. W. BROOKES,
H. J. WADE.